Patented July 31, 1934

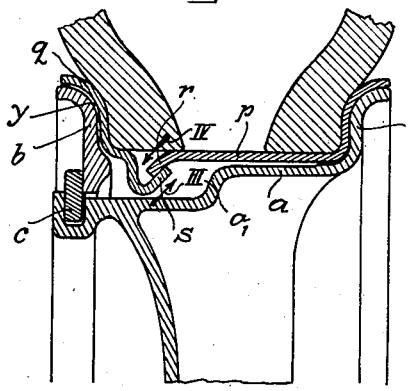
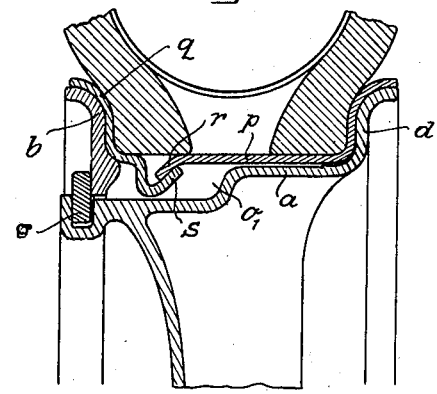
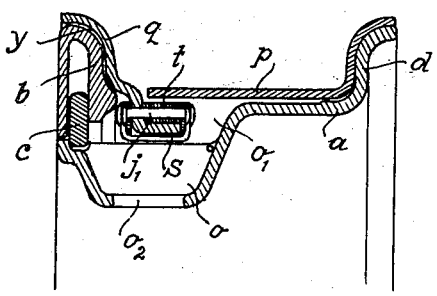
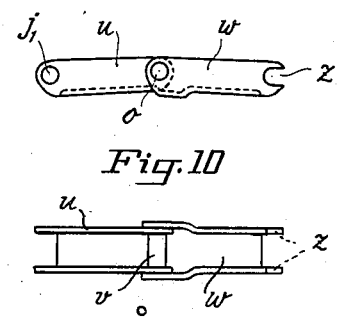
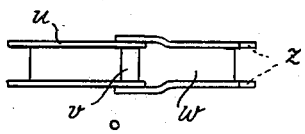
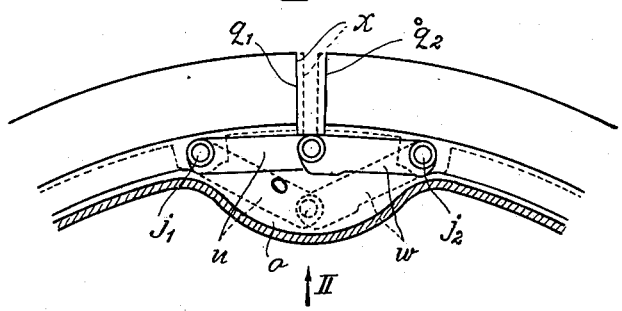

1,968,116

UNITED STATES PATENT OFFICE 1,968,116

WHEEL FOR AUTOMOBILE VEHICLES AND THE LIKE

Emil Zipper and Walter Zipper, Vienna, Austria

Application February 28, 1929, Serial No. 343,324
In Austria April 21, 1928

5 Claims. (Cl. 301—35)

Wheels for automobiles and the like with wheel rims are known, in which one felloe flange is removable and can be connected with the fixed part of the wheel felloe by means of a quick lock which consists of a single locking element. Such wheels, in which the removal and locking of the removable flange is just as simple and quick to accomplish as the unlocking and locking of a door, have proved satisfactory with tyres located directly in the wheel rim, because the indiarubber tyre connects firmly with the wheel rim in consequence of the air pressure of the inflated tire, the weight of the vehicle and the travelling stresses. The removal and putting on of the tyre can however only be effected with the air tube uninflated, and it is therefore impossible to carry inflated spare tyres on the vehicle.

Efforts have therefore been made to connect a removable rim upon which the pneumatic tyre can be completely inflated with the wheel felloe by means of a quick lock in the same manner as in the case of the abovementioned wheels. It is desired in this way both to enable spare tyres mounted on removable rims and inflated to be carried on the vehicle and at the same time to obtain an easy and quickly operable connection of the rim to the felloe. Such wheel constructions have however been found unusable, because the detachable rim upon which the great tangential and axial forces occurring in travelling directly act must be connected very firmly with the felloe, in order reliably to prevent any play between these two parts. By no locking device, however, can a connection of a detachable felloe to the felloe be obtained which is sufficiently firm both in a tangential and in an axial direction. Detachable felloes with inflated spare tyres mounted thereon have therefore hitherto only been able to be secured or clamped to the wheel felloe by means of a number of ordinary connecting screws.

The present invention relates to a wheel for automobile vehicles and the like, wherein a detachable rim divided perpendicularly to the axis of the wheel is so constructed that after being applied to the felloe it clamps itself upon the felloe under the internal pressure of the tyre, so that the removable auxiliary rim no longer has to be connected with the felloe by screws or the like but can be fastened by a single quickly and easily operable locking element. According to the invention the two parts of the rim are so connected with one another that this connection, after the rim carrying the fully inflated tyre has been mounted upon the felloe, is so far releasable that the two parts of the rim are pressed away from one another in the direction of the axis of the wheel by the internal pressure of the tyre, and consequently the clamping of the removable rim on to the wheel rim is effected by the internal pressure of the tyre. For the releasable connecting of the two parts of the detachable rim there serves an annular locking element, the diameter of which can be diminished when the rim is mounted on the wheel felloe, and which thereby sets free for a displacement in the axial direction the two parts of the rim that were previously firmly connected with one another. In this case one part of the removable rim itself is preferably constructed as a locking element, by being radially split and provided with appliances for increasing and diminishing its diameter, by which it is connected with the other part of the detachable rim firmly, and in the axial direction yieldingly.

In the accompanying drawings, Figures 1 to 4 and 5 to 10 respectively illustrate two constructional examples of the invention.

Figures 5, 6 and 7 show cross sections through the wheel rim and felloe of a second constructional form of the invention.

Figure 8 shows a longitudinal section through the wheel at the locking position.

Figures 9 and 10 illustrate a detail of the locking device.

In the constructional examples of the invention illustrated in the accompanying drawings the wheel felloe $a$ is constructed in the manner of an axially divided felloe and is provided with a detachable flange $b$, while the other flange $d$ is made in one piece with the wheel felloe $a$. The detachable flange $b$ can be connected with the felloe $a$ by means of any suitable locking device, for instance by means of an open steel ring $c$, the diameter of which can be increased and diminished by altering the distance between its ends. Upon being adjusted to the smaller diameter the ring $c$ engages in a locking groove $g$ provided in the felloe $a$ and locks the detachable flange $b$. When the diameter of the ring $c$ is increased it passes out of the locking groove $g$ and the flange $b$, together with the locking ring $c$, and also the detachable rim, can now be removed.

Figure 1:
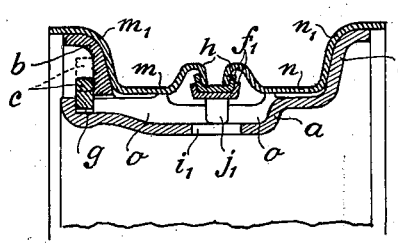
Figures 1 and 2 show cross sections through the wheel rim and felloe at the connecting point of the locking element and at an intermediate position respectively.
Figure 2:
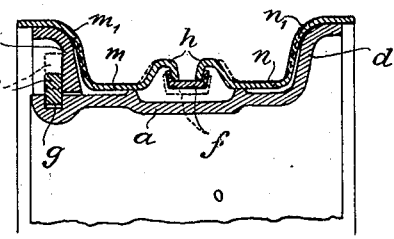

In the constructional form according to Figures 1 to 4 the removable rim is divided perpendicularly to the axis of the wheel, and its parts are denoted by $m$ and $n$. The adjacent edges $h$ of the parts $m$ and $n$ of the rim are bent upwards and then downwards, as shown in Figures 1 and 2, and connected with one another by an annular locking element $f$. The locking ring $f$, open at one point, is of channel-shaped cross section, as shown in Figures 1 and 2, and its diameter can be increased and diminished by means of a device to be hereinafter described. The downwardly directed flanges or limbs $h$ of the parts $m$ and $n$ of the rim and also the upwardly directed flanges or limbs $j_1$, of the locking ring $f$, are a little inclined, as shown in Figures 1 and 2. When the locking ring $f$ is located in the position shown in full lines in Figure 1 it holds the parts $m$ and $n$ of the rim firmly in the position indicated by full lines in Figure 1, in which its flanges are located at a short distance $y$ from the flanges $b$ and $d$ of the felloe. If the diameter of the ring $f$ is reduced, as indicated in dotted lines in Figure 2, the parts of the rim can move away from one another in the direction of the axis of the wheel, indicated by the arrow I.

Figure 3:
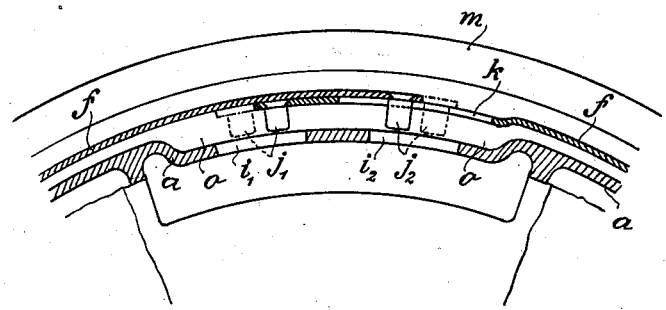
Figure 3 shows a longitudinal section through the wheel at the connecting point of the locking element.
Figure 4:
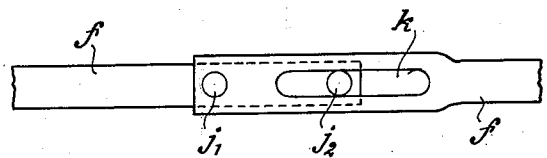
Figure 4 shows the connecting position of the locking element as seen from the axis of the wheel.

The ends of the ring $f$ overlap one another, as shown in Figures 3 and 4, and are each provided with a short pin, $j_1$ and $j_2$, accessible through apertures $i_1$ and $i_2$ provided in the felloe and can be moved nearer together and further apart by means of a suitable spannerlike implement. The pin $j_2$ of the outside end of the ring $f$, as shown in Figure 3 projects through a slot $k$ in the inner end of the ring $f$. The ring $f$ may be fastened at the greater or smaller diameter by means of any suitable locking means. At that position at which the connecting point for the ends of the ring $f$ is located, the base of the felloe $a$ is provided with a recess $o$, shown in Figures 1 and 3.

The mounting of a tyre upon the rim $m$, $n$, removed from the felloe $a$, is effected in the following manner:—

One end of the ring $f$ is pressed towards the centre of the rim and pulled sideways, whereupon the entire ring $f$ can easily be taken out of the parts $m$, $n$ of the rim. The parts $m$ and $n$ of the rim are now taken apart, the tyre is slipped on to one of them, and the other part of the rim placed in the tyre. The ring $f$ is now inserted, one of its ends being again pushed towards the centre, and is put round the flanges $h$ of the parts $m$ and $n$ of the rim. The inserted ring $f$ is adjusted to the larger diameter and locked against a reduction in diameter, whereupon the tyre is fully inflated. The rim $m$, $n$ thus provided with an inflated tyre, is now slipped on to the felloe $a$, and the flange $b$ is mounted, and locked by contracting the locking ring $c$. Since the ring $f$ is still adjusted to the greater diameter the flanges of the parts $m$ and $n$ of the rim are located at the short distance $y$ from the flanges $b$ and $d$ of the wheel rim $a$. The diameter of the ring $f$ is now reduced and the internal pressure of the tyre presses the parts $m$ and $n$ of the detachable rim apart with greater force, so that their flanges are pressed firmly against the flanges $b$ and $d$ of the felloe $a$ and a completely firm connection between the removable rim $m$, $n$ and the felloe $a$ is established.

The removable rim $m$, $n$ provided with an inflated tyre can obviously be carried on the vehicle as a spare rim. The changing of a rim carrying a damaged tyre for the spare rim is effected in the following manner:

The locking ring $c$ and the connecting ring $f$ of the rim to be exchanged are adjusted to the greater diameter, whereupon the flange $b$, together with the ring $c$ and the rim to be exchanged are removed from the felloe $a$. The spare rim $m$, $n$ and the flange $b$ are now slipped on in the manner previously described, and locked by means of the ring $c$, and finally the connecting ring $f$ of the fresh rim put on is unlocked.

According to a further feature of the invention, one part of the felloe itself it preferably constructed as a locking element for the two parts of the detachable rim. This constructional form of the invention is illustrated in Figures 5 to 10.

The detachable rim consists of a broad part $p$, which is not split in a radial direction, and of a narrower part $q$, which is radially split, so that its diameter can be increased or diminished by increasing or diminishing the distance between its ends $q_1$ and $q_2$, shown in Figure 8. The broad part $p$ of the rim is provided, at its margin facing the narrower part $q$, with a flange $r$ bent down obliquely, while the margin of the narrower part $q$ of the rim is provided with a channel-shaped bend $s$, in which the flange $r$ of the part $p$ of the rim engages as shown in Figures 5 and 6. If the diameter of the part $q$ of the rim is increased or diminished, the oblique flange $s$ slides in the direction of the arrows III and IV respectively (Figure 5) along the oblique flange $r$, and thus the distance of the flanges $m_1$ and $n_1$ of the parts $m$ and $n$ of the rim from one another is slightly decreased or increased. In the neighbourhood of each of the ends $q_1$ and $q_2$ of the part $q$ of the rim is secured a pin $j_1$, $j_2$ which serves for the fitting on of a device for increasing and diminishing the diameter of the part $q$ of the rim. To enable these pins $j_1$ and $j_2$ to be fastened to the sheet-metal rim part $q$ the oblique flange $s$ thereof is bent at right angles for quite a short length, as shown in Figure 7, and two small blocks $t$ are welded thereto, to which the pins $j_1$ and $j_2$, secured against rotation, are fastened. At this position, as Figure 7 shows, the oblique flange $r$ of the part $p$ of the rim is bent back again into the cylindrical surface of the part $p$ of the rim. To the pin $j_1$ is secured rotatably one end of a guiding link $u$, the other end of which is connected by means of a bolt $v$ with a second guiding link $w$. The free end of the guiding link $w$ is provided with a fork-shaped recess $z$, which can be suspended, as shown in Figure 8, in the pins $j_2$, so that the guiding links $u$ and $v$ form a toggle-joint closure for the ends of the part $q$ of the rim. If the bolt $v$ is pressed radially outwards in the direction of the arrow II in Figure 8, it thrusts the ends $q_1$ and $q_2$ of the parts $q$ of the rim apart, so that the gap $x$ between these two ends is increased. The bolt $v$ thus passes beyond the line joining the two pins $j_1$ and $j_2$ and enters the gap $x$, so that a self-locking occurs, and the part $q$ of the rim is established at a somewhat greater diameter. If the bolt $v$ is pressed towards the centre of the wheel the ends $q_1$ and $q_2$ approach one another and the diameter of the part $q$ of the rim is decreased.

The felloe $a$ is provided on about half its breadth with an encircling recess $o_1$, which is so deep that the oblique flange $s$ of the part $q$ of the rim does not touch the bottom of the recess $o_1$ even when the part $q$ of the rim is contracted and its flange $m_1$ rests upon the flange $b$ of the felloe $a$. At the place at which the toggle closure $u, v, w$ is located the wheel rim is provided with a deeper hollow $o$, which has an aperture $o_2$, through which the toggle closure can be actuated by means of a suitable implement. This aperture $o_2$ is closable by means of a plate, a plug screw or a screw serving for actuating the toggle closure $u, v, w$.

The fitting of a tyre on to the rim $p, q$ removed from the felloe $a$ is effected in the following manner.

The toggle closure $u, v, w$ is brought into the position indicated by dotted lines in Figure 8 and the fork-shaped recess $z$ of the guiding link $w$ is removed from the pin $j_2$. The part $q$ of the rim is now open, and its end $q_2$ can be pressed towards the centre and drawn sideways out of the part $p$ of the rim. The tyre is now slipped on to the part $p$ of the rim and the part $q$ of the rim is thereafter suspended again, with, the end $q_2$ first, in the rim part $p$, so that the oblique flanges $r, s$ interengage with one another. The fork-shaped recess $z$ of the guiding link $w$ is now mounted upon the pin $j_2$ and the toggle closure $u, v, w$ brought into the position shown in full lines in Figure 8. The parts $p$ and $q$ of the rim are now firmly connected with one another and the tyre can be fully inflated upon it. The felloe with the inflated tyre is now slipped on to the wheel rim $a$ and locked, just as in the case of the constructional form according to Figures 1 to 4, by means of the flange $b$ and the locking ring $c$. The toggle closure $u, v, w$, is now brought into the position shown in dotted lines in Figure 8, so that the part $q$ of the felloe is compressed by the internal pressure of the tyre acting in the direction of the arrow IV in Figure 5. The flanges $m_1$ and $n_1$ of the detachable rim $p, q$ settle firmly upon the flanges $b$ and $d$ of the felloe $a$, so that a completely fast connection between the rim $p, q$ and the felloe $a$ is established. The gap $x$ between the ends $q_1$ and $q_2$ of the rim part $q$ is thus essentially narrowed, but the ends $q_1$ and $q_2$ do not abut against one another even when the toggle closure $u, v, w$ is released, so the internal pressure of the tyre presses the part $q$ of the rim under all circumstances against the felloe $a$ and the flange $b$. The narrow gap $x$ remaining between the ends $q_1$ and $q_2$ is covered by an underlay $x_1$ of thin sheet material (Figure 8) so that no water can enter.

The rim $p, q$ provided with the inflated tyre may be carried on the vehicle as a spare tyre. The changing of a rim carrying a damaged tyre for a fresh one is effected in the same manner as with the constructional form illustrated in Figures 1 to 4. After unlocking the flange $b$ the latter is taken off and the rim changed. After this has been done, and the flange $b$ is locked again, the toggle closure $u, v, w$ is released.

In the constructional examples of the invention illustrated in the drawings the flanges $b$ and $d$ of the felloe $a$ are just as high as the flanges of the detachable rim. Instead of the solid flanges of the felloe, however, mere wedge surfaces might occur, against which bear the parts $m$ and $n$ or $p$ and $q$ of the detachable rim pressed away from one another by the internal pressure of the tyre.

What we claim is:

1. A vehicle wheel comprising a felly and a demountable rim, the felly having a seat for the rim laterally fixed relatively to said felly and a removable ring seat for the rim, means for locking the removable ring seat to the felly, the demountable rim consisting of two sections, each having conical connecting surfaces, the rim sections being movable relatively to each other in the direction of the wheel-axis by the inner pressure of an inflated tire to clamp the demountable rim between the fixed seat and the removable ring seat.

2. A vehicle wheel comprising a felly and a demountable rim, the felly having a fixed lateral seat for the rim and a removable ring forming a lateral seat for the rim, means for interlocking the removable ring seat with the felly, the demountable rim consisting of two sections, each section having a conical connecting surface engaging the one with the other, one of the rim sections being transversely split whereby it may be increased in diameter, both the rim sections being relatively movable in the direction of the wheel-axis by the inner pressure of an applied inflated tire to clamp the rim sections between the fixed seat and the removable ring seat.

3. A vehicle wheel comprising a felly and a demountable rim, the felly having a fixed lateral seat for the rim and a removable ring constituting a laterally removable seat for the rim, means for interlocking the removable ring seat to the felly, the demountable rim consisting of two sections, each section having a conical connecting end surface engaging with the conical end surface of the other whereby the inner pressure of an applied inflated tire will clamp the rim sections between the fixed seat and the removable ring seat, one of the rim sections being transversely split, means for expanding the transversely split section of the rim to its larger diameter both rim sections when connected together fitting lightly between said fixed seat and removable ring seat.

4. A vehicle wheel comprising a felly and a demountable rim, the felly having a fixed lateral seat for the rim and a laterally removable ring seat for the rim, means for locking the removable ring seat to the felly, the demountable rim consisting of two sections, said sections having conical connecting surfaces engaging with each other the conical connecting surfaces being so inclined that the rim sections are movable relatively to each other in the direction of the wheel-axis by the inner pressure of a tire to clamp the rim sections between the fixed seat and the removable ring seat, one of the rim sections being transversely split, and means for expanding one of the transversely split sections of the rim to loosen it from its clamping position.

5. A vehicle wheel comprising a felly and a demountable rim, the felly having a seat laterally fixed relatively to the rim and a second seat for the rim comprising a ring removable from said felly, means for interlocking the removable ring seat to the felly, the demountable rim comprising two circular sections seated between and against said seats, each of said sections having means between the sections and the felly including inclined surfaces movable to clamp a tire between said sections and between the fixed seat and the removable ring seat by the inner pressure of said tire when inflated.

EMIL ZIPPER.
WALTER ZIPPER.